United States Patent
Hernandez

(10) Patent No.: US 10,352,074 B2
(45) Date of Patent: Jul. 16, 2019

(54) PRESSURE RELEASE LATCH

(71) Applicant: QRP, Inc., Leland, NC (US)

(72) Inventor: Andres Hernandez, Yorba Linda, CA (US)

(*) Notice: Subject to any disclaimer, the term of this patent is extended or adjusted under 35 U.S.C. 154(b) by 315 days.

(21) Appl. No.: 14/621,648

(22) Filed: Feb. 13, 2015

(65) Prior Publication Data

US 2015/0232189 A1 Aug. 20, 2015

Related U.S. Application Data

(60) Provisional application No. 61/940,464, filed on Feb. 16, 2014.

(51) Int. Cl.
*B64D 29/06* (2006.01)
*E05B 19/14* (2006.01)
*E05C 19/14* (2006.01)
*E05B 41/00* (2006.01)
(Continued)

(52) U.S. Cl.
CPC ............ *E05C 19/145* (2013.01); *B64D 29/06* (2013.01); *B64D 29/08* (2013.01); *E05B 5/00* (2013.01);
(Continued)

(58) Field of Classification Search
CPC .... Y10S 292/11; Y10S 292/31; Y10S 292/49; Y10T 292/0824; Y10T 292/0936; Y10T 292/0946; Y10T 292/0947; Y10T 292/0948; Y10T 292/0949; Y10T 292/1062; Y10T 292/1076; Y10T 292/108; Y10T 292/1078; Y10T 292/20; Y10T 292/202; Y10T 292/216; Y10T 292/225; E05B 51/023; E05B 15/0086;
(Continued)

(56) References Cited

U.S. PATENT DOCUMENTS 2,927,812 A 3/1960 Smith et al.
2,945,274 A * 7/1960 Paterson ............... E05C 19/145
24/270
(Continued)

FOREIGN PATENT DOCUMENTS

EP 1197619 4/2002
WO WO2011069103 6/2011

OTHER PUBLICATIONS

European Patent Office, European Search Report, dated Sep. 7, 2015, Four (4) pages.

*Primary Examiner* — Alyson M Merlino
(74) *Attorney, Agent, or Firm* — Ryder, Mazzeo & Konieczjy LLC; Joseph M. Konieczjy, Sr.; Gregory J. Gore

(57) ABSTRACT

A blowout latch includes a rotatable bolt that secures a first panel that is adjacent to a second panel to which the latch is affixed. The bolt is restrained by a toggle linkage that operates at one end of the bolt against a pressure-actuated spring. The linkage will release the bolt when an excessive opening force against the bolt exceeds a selected restraining force of the spring. When that condition occurs, the linkage will have deflected the spring and moved to a position where the end of the linkage bearing against spring loses it mechanical leverage with respect to the bolt. Thereafter, the bolt is free to continue rotation to a fully open position. The latch also includes a manual trigger release that disables the restraining linkage and permits free rotation of the bolt to the fully open position when this trigger is actuated.

15 Claims, 6 Drawing Sheets

(51) Int. Cl.
*E05B 51/02* (2006.01)
*E05C 3/08* (2006.01)
*E05B 5/00* (2006.01)
*B64D 29/08* (2006.01)

(52) U.S. Cl.
CPC .............. *E05B 19/14* (2013.01); *E05B 41/00* (2013.01); *E05B 51/023* (2013.01); *E05C 3/08* (2013.01); *Y10T 292/108* (2015.04)

(58) Field of Classification Search
CPC .......... E05B 65/102; E05B 5/00; E05B 41/00; E05C 19/10; E05C 19/12; E05C 19/14; E05C 19/145; E05C 3/006; E05C 3/008; E05C 3/12; E05C 3/122; E05C 3/124; E05C 3/16; E05C 3/162; E05C 3/22; E05C 3/30; E05C 3/08; B64D 29/06; B64D 29/08
See application file for complete search history.

(56) References Cited

U.S. PATENT DOCUMENTS

| | | | |
|---|---|---|---|
| 4,307,905 A | | 12/1981 | Poe et al. |
| 5,620,212 A | * | 4/1997 | Bourne ................ B64D 29/06 292/113 |
| 6,279,971 B1 | * | 8/2001 | Dessenberger, Jr. ... E05B 41/00 292/DIG. 31 |
| 6,343,815 B1 | * | 2/2002 | Poe ....................... E05C 19/145 292/113 |
| 6,513,841 B1 | | 2/2003 | Jackson |
| 7,185,926 B2 | | 3/2007 | Helsley et al. |
| 7,578,475 B2 | | 8/2009 | Pratt et al. |
| 2002/0195827 A1 | | 12/2002 | Jackson et al. |
| 2005/0087996 A1 | | 4/2005 | Jackson et al. |
| 2006/0214431 A1 | | 9/2006 | Helsley et al. |
| 2012/0242096 A1 | | 9/2012 | Rozema |

* cited by examiner

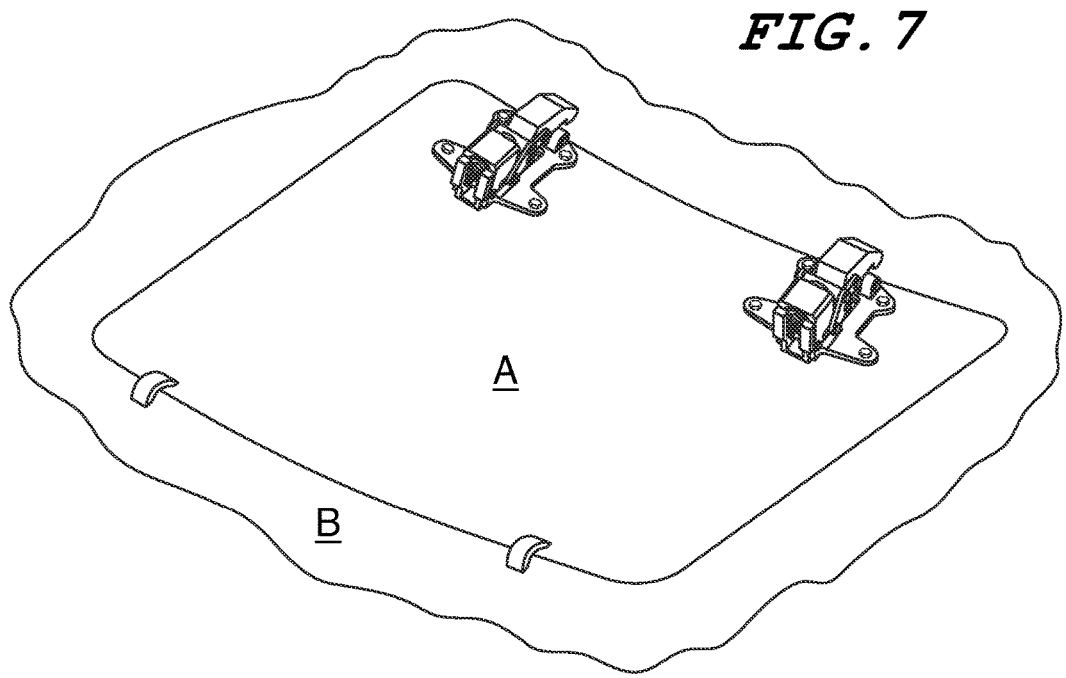

PRESSURE RELEASE LATCH

CROSS-REFERENCE TO RELATED APPLICATION

This application claims benefit of U.S. Provisional Application No. 61/940,464 filed on Feb. 16, 2014, the contents of which are hereby incorporated by reference as if fully set forth herein.

FIELD OF THE INVENTION

This invention relates to the field of latches in the mechanical arts for holding adjacent moveable panels in a fixed position. More specifically it relates to a bi-modal pressure release "blowout" latch for use in aircraft.

BACKGROUND OF THE INVENTION

A blowout latch is a type of latch that releases when excessive pressure is applied to the panel or door which the latch secures. These latches can have many applications but are typically used on aircraft in places such as on the panels which cover the aircraft's engine. When excessive pressure is applied to the enclosing panels, the blowout latch will allow the panels to open to avoid damage to the panels or other aircraft structures. A desired feature of blowout latches is the ability to alternately manually open the latch. Another desired feature is a prominent visual indication of when the latch has been released.

A problem exists with prior art blowout latches however in that they are undesirably complicated, heavy, and relatively non efficient for aircraft applications. There is therefore a need in the art to provide a latch that overcomes these deficiencies.

SUMMARY OF THE INVENTION

The applicant has devised a pressure release or blowout latch that provides all the desired traits recognized in the art with a more compact, efficient and light-weight design. Applicant's pressure release latch can also be manually operated, and prominently shows when the latch is open even if the panels appear to be closed.

Applicant's latch mechanism includes a rotatable bolt that abuts a first panel, which is adjacent to a second panel to which the latch is affixed. The bolt is restrained by a linkage that operates at one end of the bolt against a pressure-actuated spring. In accordance with the mechanical relations of the linkage, the bolt will release soon after the opening force against the bolt exceeds a selected restraining force of the spring. When that condition occurs, the linkage will have deflected the spring and moved to a position where the end of the linkage bearing against the spring loses it mechanical leverage with respect to the bolt. Thereafter the bolt is free to continue rotation to the fully open position.

Alternatively, the latch of the invention includes a manual trigger release that disables the restraining linkage and thus permits free movement of the bolt to the open position urged there by a bolt-opening spring. By depressing a trigger, one end of one arm of the linkage which is otherwise held in a fixed position by the trigger is allowed to move within parallel slots of the latch housing in a direction away from the bolt pivot. This sliding movement of the linkage disables its restraining affect on the bolt, which will then open. The latch includes a manual reset pad affixed to an end of the bolt that is of sufficient size so that it is convenient to operate and is easily visible from a distance to indicate when the latch has been opened.

More specifically, the applicant has invented a panel latch comprising a housing with means for attachment to a panel. The housing carries a bolt rotatably affixed at a bolt pivot joint that permits it to rotate between closed and open positions. A second joint on the body of the bolt receives a pinned first end of arms of a bolt restraining linkage. A second end of the arms is attached to a pair of levers by another pinned joint located at an intermediate point along the length of the levers. A first end of the levers is rotatably and translatably affixed to the housing and selectively secured against translational movement by a trigger that is manually moveable between secured and released positions. When the trigger is moved to the released position, the first end of the levers is then free to move away from the bolt thus disabling the restraining linkage and permitting the bolt to freely move from the closed to the open position. In one embodiment the levers are triangular plates that operate on opposite sides of the housing.

The bolt can also be moved to the open position without actuation of the trigger when excessive external opening pressure is applied to the bolt. A second end of the levers can move when a retaining spring assembly operating against that end of the levers is deflected by force transmitted from the bolt though the linkage. The various pinned joints of the linkage form a toggle linkage so that as the spring assembly is further deflected by the bolt force, movement of the levers places the joint at the first end of the linkage arms in an over-center position between the lever joint and the bolt pivot joint. When this position is achieved, the restraining force of the linkage against the bolt is released thereby permitting the bolt to freely continue its movement to the open position urged by the bolt spring.

The latch of the present invention provides many advantages over similar devices in the art including reduced weight because two functionalities are provided by a single mechanism. Also, it provides reduced complexity because the device has fewer components and requires no tools to open the latch. The device also provides a reduction in volume by eliminating the need for additional assemblies. Finally, the means by which the spring mechanism is actuated allows the device to be a significantly more efficient mechanism during the pressure relief operation.

These and other advantages will be apparent from the following drawings and description of the preferred embodiment. In this respect, before explaining at least one embodiment of the invention in detail, it is to be understood that the invention is not limited in its application or to the details of construction in the following description or illustrated in the drawings. The invention is capable of other embodiments and of being carried out in various ways.

BRIEF DESCRIPTION OF THE DRAWINGS

FIG. 7 is a bottom right view of the latch with related panels.

DESCRIPTION OF THE PREFERRED EMBODIMENT

Detailed views of the pressure release panel latch of one embodiment of the invention are shown in FIGS. 1-7. By the accompanying description, a complete understanding of this embodiment of the invention is taught. Like numbering of the individual components correspond to those in all other Figures. The Figures need only depict views from one side since the embodiment shown is symmetrical about its longitudinal axis and thus the side elevation views are substantially mirror images of one another. The numbering of all parts in each Figure is not necessary when taken in concert with the following description of each Figure.

Figure 1:
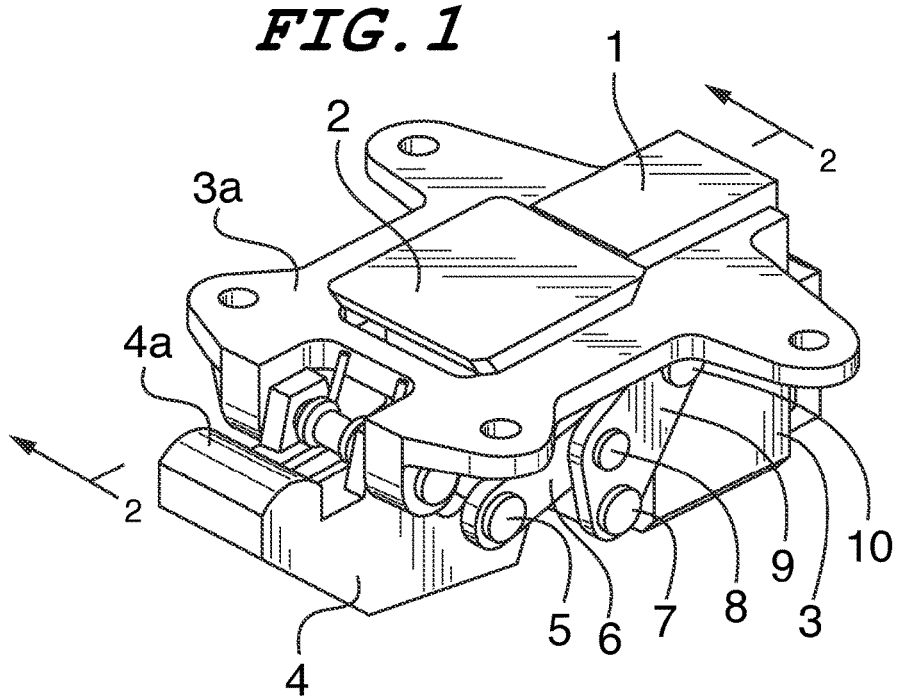
FIG. 1 is a top right front perspective view of one embodiment of the invention.
Figure 5A:
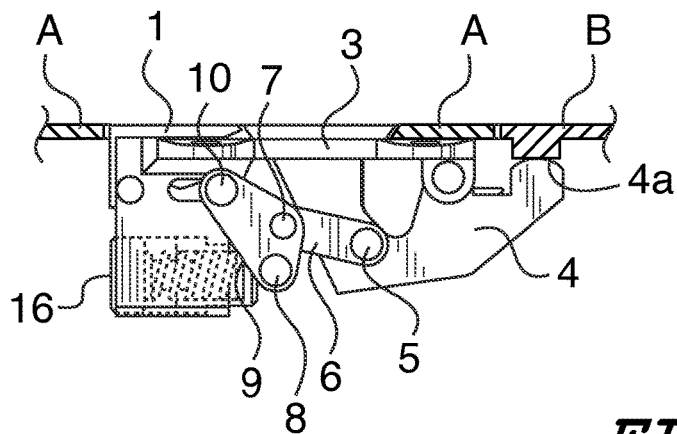
FIGS. 5*a*-5*c* are sequential left side elevations of the device in various configurations.

Referring now to FIG. 1, the latch is shown in its closed position. The components of the latch are joined to housing 3, which includes recessed flange 3a at the top with means for attachment to a fixed structure such as the panel "B" or movable door panel "A" shown in FIG. 7. After attachment the recessed flange allows the topmost elements of the latch to lay flush with the door panel "A" as shown in FIG. 5A. Bolt 4 is rotatably affixed to the housing 3 and is secured by pivot pin 12 at opposite ends between legs of a yoke at the front of the housing 3. The bolt 4 includes an engagement end 4a for abutment with the secured element such as a second panel or ["B"]. Rotation of bolt 4 in the direction of the open position is constrained by a compression linkage comprising a series of rotatable joints formed by pins 5, 7, 8, and 10. Trigger 1 and a bolt reset pad 2 which is integral with the bolt have planar top surfaces lying in the same plane when the latch is closed.

Figure 2:
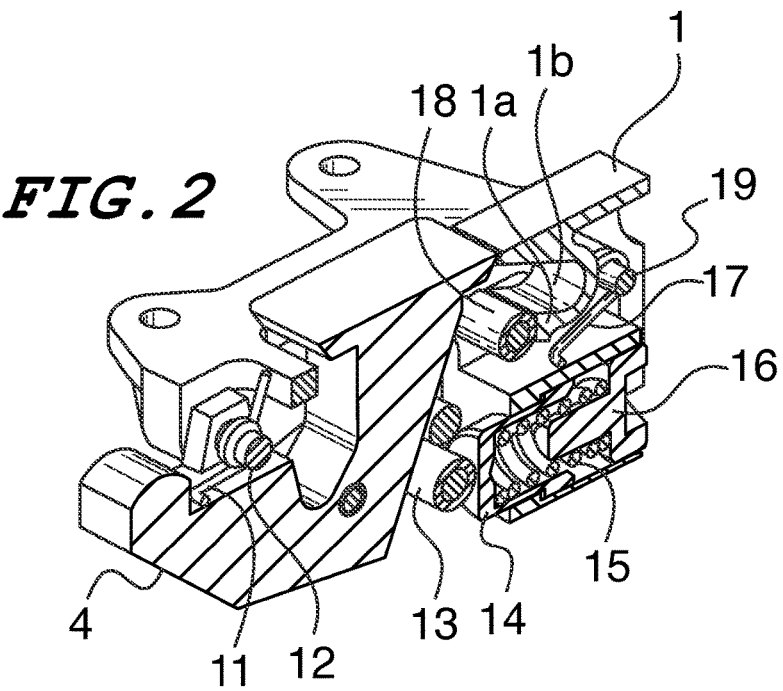
FIG. 2 is a partial sectional view taken along lines 2-2 of FIG. 1.

A shown in FIG. 2, the ends of the lever means 9 shown in FIG. 1 include pinned rollers 13 and 18 within the joints formed by pins 7 and 10, respectively. Roller 18 bears against a catch portion 1a of the trigger 1 and roller 13 bears against a spring assembly comprising a spring 15, an end cap 14, and a calibration screw 16. The bolt is rotatable between open and closed positions about pin 12 and is biased toward the open position by torsion spring 11. The trigger 1 pivots about pin 19 and is biased to this bolt-securing home position by spring 17.

Figure 3:
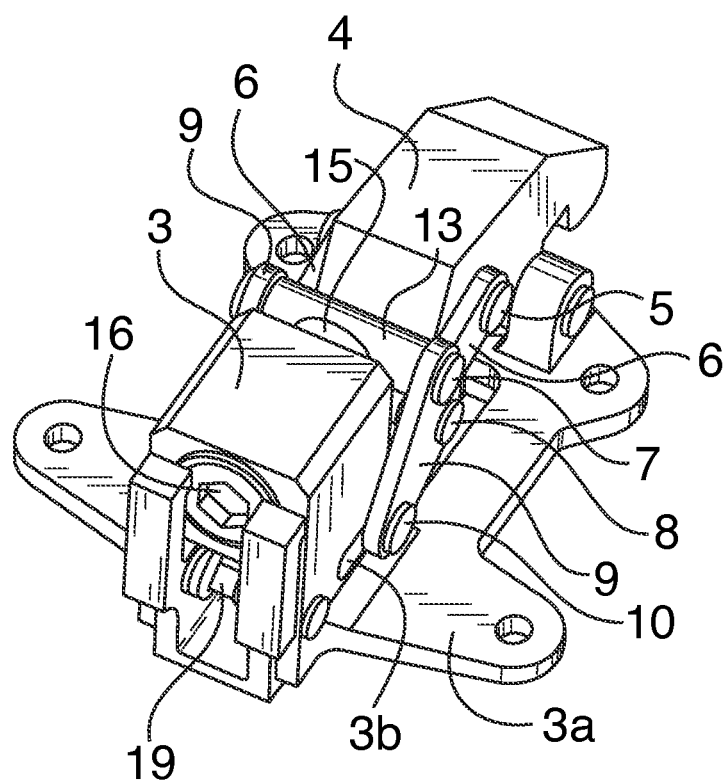
FIG. 3 is a bottom right front perspective view.

Referring now to FIG. 3 the present latch is viewed from the bottom. The compression linkage comprises a pair of restraining arms 6 pinned to the bolt 4 that move levers 9 as the bolt is rotated toward the open position. A first end of the restraining arms 6 is pinned to the bolt 4 at a joint formed by rivet pin 5 while a second end of the arms is attached to the levers 9 by pin 8 at a lever center joint intermediate the length of the levers. The levers 9 are triangular plates configured to provide the necessary geometries of operation while creating a very compact mechanism because the linkage operates in planes alongside of the bolt. A first end of the levers 9 is translatably and rotatably secured to the housing at a slide joint by a slide pin 10 that passes through parallel slots 3b in opposing sides of the housing 3 that extend downward from its top that includes mounting flange 3a. A second end of the levers 9 is unconstrained except for abutment between its pinned roller 13 and the end cap 15 of the spring assembly that is regulated by calibration screw 16. When the trigger is depressed this construction causes the levers 9 to shift away from the bolt as the pin 10 at a first end of the levers is pushed along the housing slots by the force of the bolt spring 15 as it moves the bolt to the open position.

Figure 4:
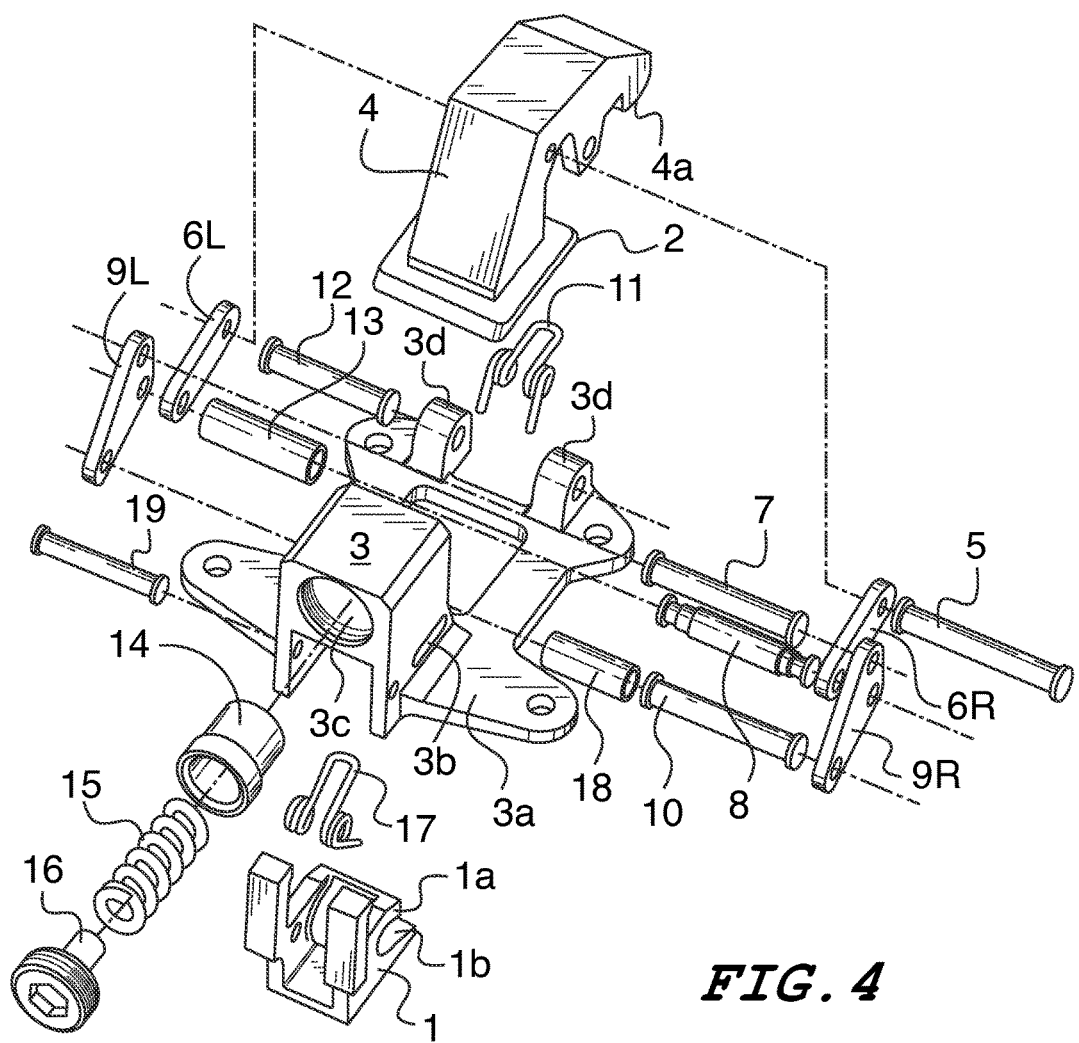
FIG. 4 is a bottom right front assembly view.

Referring now to FIG. 4, this assembly view better shows the individual components of the latch and in particular the various features of the housing. The housing 3 includes a main body portion with sides that extend downward from a mounting flange 3a at the top. Slot 3b through the one side of the housing shown has a corresponding parallel slot through the opposite side that receives slide pin 10. A bore 3c between the sides of the housing receives a blow-out spring assembly comprising spring 15, end cap 14, and calibration screw 16. The end cap 14 is closely received within the bore 3c in the housing to control its movement. Legs 3d at the front of the housing form a yoke that holds the bolt at its pivot joint by pin 12. In this embodiment the lever means is formed by two opposing triangular plates 9L and 9R on either side of the housing 3. Similarly the restraining arm means is a construction of two opposing members 6L and 6R that operate along the sides of the bolt 4. These inter-fitting structures provide a very compact, strong, and effective mechanism.

Figure 5B:
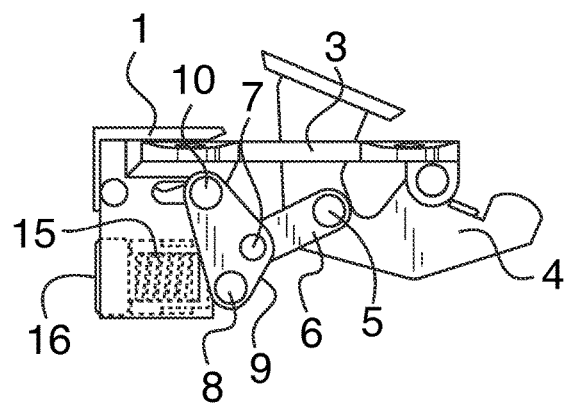
Figure 5C:
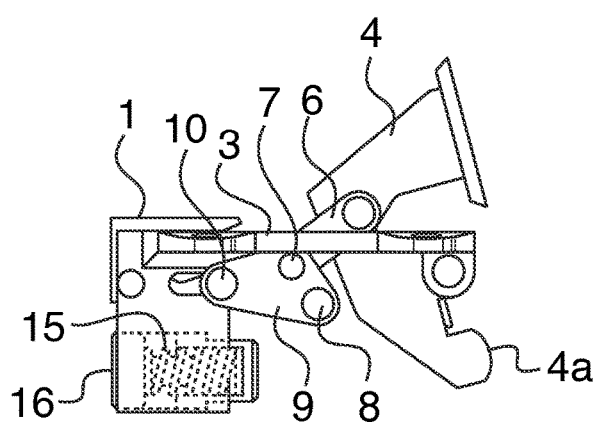

FIGS. 5A through 5C depict a sequence of operation of the present latch which will occur when it responds to excessive opening pressure applied to the bolt. This embodiment of the invention provides for the self-opening of a latched door when excessive opening pressure is applied to the door as in a "blow-out" condition. Beginning at FIG. 5A the latch is shown in its closed position attached to panel A with the operative end 4a of bolt 4 abutting door B. With the trigger is in its home secured position, the slide pin remains immobilized. Then, if excessive pressure is applied by the door against the engagement end 4a of the bolt, force transmitted through the linkage will deflect one end of the lever means 9 by pin 8 compressing the spring 15. This motion will proceed to a point where the restraining arm joint of the bolt moves over-center with respect to the bolt pivot and lever center joint as seen in FIG. 5B. This causes restraining force against the bolt to be released and thereafter the bolt can continue to swing unconstrained to the full open position shown in FIG. 5C. The amount of force supplied by spring 15 is controlled by calibration screw 16 at one end of the spring which determines the captive spring length.

Figure 6A:
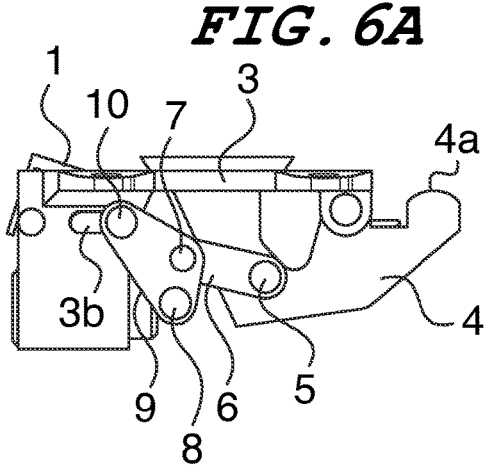
FIGS. 6*a*-6*c* are sequential left side elevations of the device in various configurations.
Figure 6B:
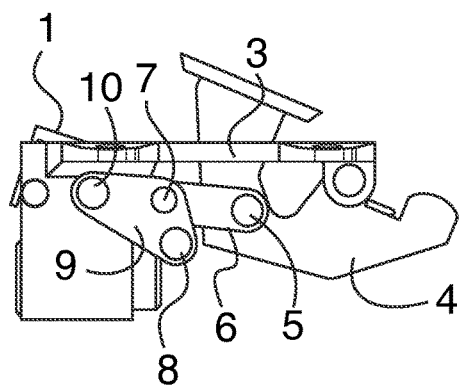
Figure 6C:
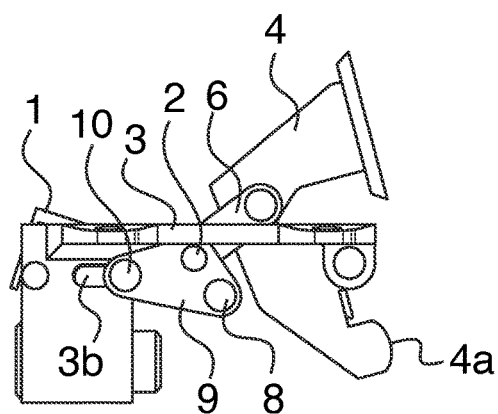

With continued reference to the previous Figures and more particularly now to FIGS. 6A through 6C, manual release of the latch can occur simply by depressing trigger 1. The trigger includes release catch 1a shown in FIGS. 2 and 4 that bears against the slide joint pin 10 at a second end of the lever preventing its movement away from the bolt. This maintains the restraining force of the linkage against the bolt. When the front of the trigger 1 is manually depressed to a release position, the catch portion of the trigger is removed from withholding the pin 10 so that it can now freely slide along the slots in the housing. This releases the restraining linkage by allowing it to freely shift away from the bolt as shown in FIG. 6B. With the linkage thus disabled the bolt can now easily pivot from the closed to the open position shown in FIG. 6C being biased in that direction by its torsion spring 11 shown in FIG. 2. By these mechanical relations the bolt can only freely move from the closed position when the trigger is depressed.

In either case of trigger release or pressure release as described above, one end of the lever or the other deflects away from the bolt, releasing the linkage's restraining force against the bolt to allow the door to open. To reclose the door, the bolt 4 may be reset to its closed position by manually depressing reset pad 2 which is integral with the bolt 4 opposite the engagement end.

It will be readily understood by those in the mechanical arts that the dimensions of the various components of the invention can be selected to operate as described above without limitation to the particular configuration, proportions and dimensions shown in the preferred embodiment. As such the invention is to be defined only by the following claims and their legal equivalents.

What is claimed is:

1. A panel latch, comprising:
a housing having downward extending opposite sides and a top planar portion including means for attachment to a panel;
a bolt rotatably affixed to the housing at a pivot joint intermediate first and second ends of the bolt, said bolt being moveable between closed and open positions and being held in the closed position by a compression linkage, said linkage comprising;
a second joint on the bolt connecting a pinned first end of restraining arm means of said linkage;
a second end of the restraining arm means attached to lever means of said linkage at a third joint located at a point along a length of the lever means between first and second ends of the lever means;
the first end of the lever means is rotatably and translationally affixed to the housing by a slide pin residing within and extending between opposing slots in said sides of the housing;
a trigger affixed to the housing so as to be selectively moveable between secured and released positions and having a catch portion abutting the slide pin preventing translational movement of the first end of the lever means when the trigger is in the secured position; and
wherein the bolt can move freely from the closed position to the open position only when the trigger is in the released position.

2. The panel latch of claim 1 wherein the second end of the lever means is in abutment with a spring assembly such that when the bolt is in the closed position and the trigger is in the secured position and excessive opening pressure is applied to the first end of the bolt, the bolt will forcibly advance toward the open position by the second end of the lever means deflecting a spring of the spring assembly.

3. The panel latch of claim 2 wherein the spring is deflectable to a point after which further advancement of the bolt will release all restraining force of the linkage against the bolt.

4. The panel latch of claim 3 wherein the position of the linkage where all restraining force of the linkage against the bolt is released is a position where second and third joints of the linkage are in over-center alignment with the bolt pivot joint.

5. The panel latch of claim 4 wherein the spring comprises a compression spring and the spring assembly further comprises an end cap surrounding a front end of the compression spring.

6. The panel latch of claim 5 wherein the spring assembly further comprises a calibration screw which threadably engages said housing and contacts a back end of the spring for selectively changing a captive length of the spring.

7. The panel latch of claim 6 wherein the spring resides within a bore located between the sides of the housing.

8. The panel latch of claim 4 further including a door hingedly connected to the panel to which the latch is affixed and wherein said first end of the bolt abuts the door when the bolt is in the closed position.

9. The panel latch of claim 8 further including a third spring that biases said trigger toward the secured position.

10. The panel latch of claim 1 wherein the lever means comprises an assembly of two opposing triangular plates located on the opposite sides of the housing.

11. The panel latch of claim 1 further including a manual reset pad at the second end of the bolt opposite the first end.

12. The panel latch of claim 11 wherein tops of the trigger and the reset pad have planar surfaces which lie in the same plane when the bolt is in the closed position and the trigger is in the secured position.

13. The panel latch of claim 12 wherein the means for attachment to the panel is a flange that is recessed from said plane of the planar surfaces of the trigger and the reset pad.

14. The panel latch of claim 13 further including a second spring which biases the bolt toward the open position.

15. The panel latch of claim 11 wherein the restraining arm means is a construction of two opposing members operating along sides of the bolt.

* * * * *